United States Patent [19]

Yates, III

[11] Patent Number: 4,816,510

[45] Date of Patent: Mar. 28, 1989

[54] COMPATIBLE POLYPHENYLENE ETHER-LINEAR POLYESTER BLENDS CONTAINING MICA REINFORCEMENT

[75] Inventor: John B. Yates, III, Glenmont, N.Y.

[73] Assignee: General Electric Company, Selkirk, N.Y.

[21] Appl. No.: 85,034

[22] Filed: Aug. 12, 1987

[51] Int. Cl.$^4$ .................................................. C08K 3/34
[52] U.S. Cl. ................................. 524/449; 524/504; 524/505; 524/508; 524/537
[58] Field of Search ........................................... 524/449

[56] References Cited

U.S. PATENT DOCUMENTS

| | | | |
|---|---|---|---|
| 4,090,996 | 5/1978 | Gergen et al. | 525/92 |
| 4,123,410 | 10/1978 | Lee | 525/92 |
| 4,220,735 | 9/1980 | Dieck et al. | 525/92 |
| 4,283,326 | 8/1981 | Charles et al. | 524/449 |
| 4,467,057 | 8/1984 | Dieck et al. | 524/449 |
| 4,533,680 | 8/1985 | Kasuga et al. | 524/449 |
| 4,560,715 | 12/1985 | Ueeda et al. | 524/449 |
| 4,672,086 | 6/1987 | Seiler et al. | 524/127 |
| 4,677,150 | 6/1987 | Chacko et al. | 524/449 |

FOREIGN PATENT DOCUMENTS 57-209956 12/1982 Japan.

*Primary Examiner*—Lewis T. Jacobs
*Attorney, Agent, or Firm*—Francis T. Coppa

[57] ABSTRACT

Thermoplastic blends having excellent surface appearance and improved coefficient of thermal expansion are prepared from a polyphenylene ether, a linear polyester such as a poly(alkylene dicarboxylate), a polymer containing a substantial proportion of aromatic polycarbonate units, and property improving amounts of mica reinforcement.

13 Claims, No Drawings

COMPATIBLE POLYPHENYLENE ETHER-LINEAR POLYESTER BLENDS CONTAINING MICA REINFORCEMENT

FIELD OF THE INVENTION

This invention relates to novel resinous compositions of compatible polyphenylene ether-linear polyester blends which offer high solvent resistance, excellent surface finish in molded parts and improved lower coefficients of thermal expansion.

BACKGROUND OF THE INVENTION

Polyphenylene ethers are a widely-used class of thermoplastic engineering resins characterized by excellent hydrolytic stability, dimensional stability, toughness, heat resistance and dielectric properties. They are also resistant to high temperature conditions under many circumstances.

A disadvantage of polyphenylene ethers which militates against their use in many applications and particularly certain automotive applications is their low resistance to non-polar solvents such as gasoline. In several copending applications which will be described in greater detail below, highly compatible polymer blends of polyphenylene ether and linear polyester resins provide beneficial improvements in the chemical resistance required for automotive applications.

However, chemical resistance is not the only important physical property of such thermoplastic blends. In particular, for certain automotive applications, it is desirable that the molded thermoplastic product exhibit a low coefficient of thermal expansion. This is required because automobiles experience a very wide range of operating conditions between the extremes of very hot and very cold temperatures. Inadequate coefficients of thermal expansion can cause a plastic part to experience undesirable changes in dimensional tolerances depending upon the circumstances.

Although it is well-known that coefficients of thermal expansion can be influenced by careful selection of filler materials for thermoplastic blends, it is also well-known that many fillers for thermoplastics will provide unsightly, blemished surfaces which are inappropriate for high-quality automotive applications.

Furthermore, while many fillers can offer adequate reinforcing properties for thermoplastic blends other physical properties (such as impact and tensile properties) are often adversely affected. It has now been discovered that mica filler may be utilized in combination with compatible polyphenylene ether-linear polyester blends to provide thermoplastic molding compositions exhibit the aforementioned necessary chemical resistance, improved coefficients of thermal expansion, and good surface appearance characteristics. As will be seen in the examples below, this goal is accomplished without unreasonably sacrificing other physical properties of the thermoplastic resin, such as impact strength and tensile properties.

In co-pending commonly-owned application, serial number 891,457 filed July 29, 1986, there are disclosed highly compatible polymer blends having a high degree of impact resistance and solvent resistance. These blends comprise at least one polyphenylene ether or blend thereof with at least one polystyrene, at least one poly(alkylene dicarboxylate), at least one elastomeric polyphenylene ether-compatible impact modifier, and at least one polymer containing a substantial proportion of aromatic polycarbonate units. Illustrative of the linear polyesters are the poly(alkylene dicarboxylates) and especially the poly(alkylene terephthalates). In copending, commonly owned application, serial number 010,867 filed Feb. 4, 1987, there are disclosed similar polymer blends which are highly compatible and have high solvent resistance and favorable tensile properties but which are particularly useful in applications where impact strength is not the primary consideration. In copending, commonly owned application Ser. No. 031,344 filed Mar. 26, 1987, similar polymer blends containing phosphate fibers provided improved coefficients of thermal expansion and good surface appearance. Each of these applications is incorporated by reference.

In one of its embodiments, the present invention is directed to a filled composition comprising the following components and any reaction products thereof, to all percentage proportions being by weight of total resinous components:

A. about 10 to 80% and preferably 10 to 50% of at least one polyphenylene ether or blend thereof with at least one polystyrene;

B. about 10 to 90% and preferably 20 to 80% of at least one polyalkylene dicarboxylate, the weight ratio of component A to component B being at most 4:1 and for many typical formulations a preferred ratio is 1.2:1; and C. from 3% to about 50% of at least one polymer containing a substantial proportion of aromatic polycarbonate units and having a weight average molecular weight of at least about 40,000 as determined by gel permeation chromatography relative to polystyrene, or a blend thereof with a styrene homopolymer; and D. a property improving amount, up to about 50 parts and generally 1 to 30 parts by weight per 100 parts of the foregoing resinous materials of mica reinforcement. Preferred compositions will contain about 5 to 20 parts of the mica filler.

Incorporation of mica has been found to be effective for improving the coefficient of thermal expansion of the resinous molding composition while providing molded parts having good surface appearance.

For many thermoplastic applications where impact properties are also important, a rubbery impact modifier as will be described below may be utilized in effective amounts.

It is not certain whether any or all of the components in these compositions interact chemically upon blending. Therefore, the invention includes compositions comprising said components and any reaction products thereof as well as other optional components described hereinafter.

The polyphenylene ethers (also known as polyphenylene oxides) used as all or part of component A in the present invention comprise a plurality of structural units having the formula

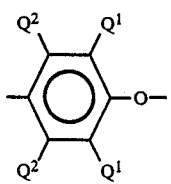

(I)

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-,3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is allyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 and preferably at least 0.25 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874; 3,306,875; 3,914,266 and 4,028,341. They are usually combinations of cuprous or cupric ions, halide (i.e., chloride, bromide or iodide) ions and at least one amine.

Catalyst systems containing manganese compounds constitute a second preferred class. The are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydrooxyazo compounds, w-hydroxyoximes (monomeric and polymeric), o-hydroxyaryl oximes and B-diketones. Also useful are known cobalt-containing catalyst systems. Suitable manganese and cobalt-containing catalysts systems for polyphenylene ether preparation are known in the art by reason of disclosure in numerous patents and publications.

The polyphenylene ethers which may be used in the invention include those which comprise molecules having at least one of the end groups of the formulas

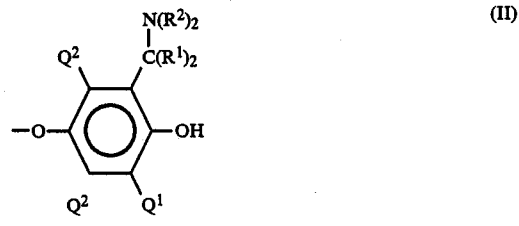 (II)

and

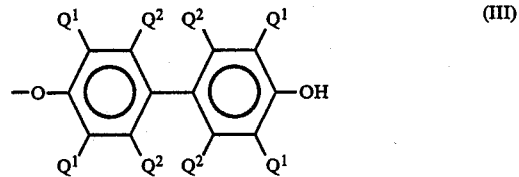 (III)

wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Polymers containing the end groups of formula II (hereinafter "aminoalkyl end groups") may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethyl-amine, frequently become chemically bound to the polyphenylene ether, most often by replacing one of the alpha-hydrogen atoms in one or more $Q^1$ radicals The principal site of reaction is the $Q^1$ radical adjacent to the hydroxy group on the terminal unit of the polymer chain. During further processing and/or blending, the aminoalkyl end groups may undergo various reactions, probably involving a quinone methide-type intermediate, with numerous beneficial effects often including an increase in impact strength and compatibilization with other blend components. Reference is made to U.S. Pat. Nos. 4,054,553; 4,092,294; 4,477,649; 4,477,651; and 4,517,341, the disclosures of which are incorporated by reference herein.

Polymers with 4-hydroxybiphenyl end groups of formula III are typically obtained from reaction mixtures in which a by-product diphenoquinone is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features.

The use of polyphenylene ethers containing substantial amounts of unneutralized amino nitrogen may, under certain conditions, afford compositions with undesirably low impact strengths. The possible reasons for this are explained hereinafter. The amino compounds include, in addition to the aminoalkyl end groups, traces of amine (particularly secondary amine) in the catalyst used to form the polyphenylene ether.

It has further been found that the properties of the compositions can often be improved in several respects, particularly impact strength, by removing or inactivating a substantial proportion of the amino compounds in the polyphenylene ether. Polymers so treated are sometimes referred to hereinafter as "inactivated polyphenylene ethers". They preferably contain unneutralized amino nitrogen, if any, in amounts no greater than 800 ppm. and more preferably in the range of about 200 to 800 ppm. Various means for inactivation have been developed and any one or more thereof may be used.

One such method is to precompound the polyphenylene ether with at least one non-volatile compound containing a carboxylic acid, acid anhydride or ester group, which is capable of neutralizing the amine compounds. This method is of particular interest in the preparation of compositions of this invention having high resistance to heat distortion. Illustrative acids, anhydrides and esters are citric acid, malic acid, agaricic acid, succinic acid, succinic anhydride, maleic acid, maleic anhydride, citraconic acid, citraconic anhydride, itaconic acid, itaconic anhydride, fumaric acid, diethyl maleate and methyl fumarate. Because of their relatively high reactivity with amino compounds, the free carboxylic acids and especially fumaric acid are generally most useful.

Reaction of the polyphenylene ether with the acid or anhydride may be achieved by heating at a temperature within the range of about 230° to 390°, in solution or preferably in the melt. In general, about 0.3 to 2.0 and preferably about 0.5 to 1.5 part (by weight) of acid or anhydride is employed per 100 parts of polyphenylene ether. Said reaction may conveniently be carried out in an extruder or similar equipment.

Another method of inactivation is by extrusion of the polyphenylene ether under the above-described conditions with vacuum venting. This may be achieved either in a preliminary extrusion step (which is sometimes preferred) or during extrusion of the composition of this invention, by connecting the vent of the extruder to a vacuum pump capable of reducing the pressure to about 20 torr or less.

It is believed that these inactivation methods aid in the removal by evaporation or the neutralization of any traces of free amines (predominantly secondary amines) in the polymer, including amines generated by conversion of aminoalkyl end groups to quinone methides of the type represented by formula IV. Polyphenylene ethers having a free amine nitrogen content below about 600 PPM. have been found particularly useful in this invention. However, the invention is not dependent on any theory of inactivation.

The preparation of inactivated polyphenylene ethers by reaction with acids or anhydrides, together with vacuum venting during extrusion, is illustrated by the following examples. All parts n the examples herein are by weight.

PREPARATION OF INACTIVATED PPE

A mixture of 1.43 parts of maleic anhydride and 100 parts of a poly-(2,6-dimethyl-1,4-phenylene ether) having a number average molecular weight (as determined by gel permeation chromatography) of about 20,000 and an intrinsic viscosity in chloroform at 25° C. of 0.46 dl./g. was tumble-mixed for 15 to 30 minutes and then extruded on a 20-mm. twin screw extruder at 400 rpm over a temperature range of about 310° to 325° C. The feed rate of the mixture was about 524 grams per 10 minutes. The extruder was vacuum vented with a vacuum pump to a pressure less than 20 torr during the extrusion. The product was an inactivated polyphenylene ether.

When the procedure of the foregoing preparation was repeated, substituting 0.7 and 1.4 parts (respectively) of fumaric acid for the maleic anhydride and extruding over a temperature range of about 300 to 325° C., similar products were obtained. And when the preparation was repeated, substituting 0.7 part of citric acid for the fumaric acid, again, a similar product was obtained.

Pure polyphenylene ethers are generally brittle and difficult to process by molding, extrusion and similar operations. One art-recognized means for improving processability is to blend the polyphenylene ether with a polystyrene. Thus, it is within the scope of the invention for component A to contain at least one polystyrene.

The term "polystyrene" as used herein includes polymers prepared by methods known in the art including bulk, suspension and emulsion polymerization, which contain at least 25% by weight of structural units derived from a monomer of the formula

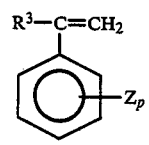

(IV)

wherein R³ is hydrogen, lower alkyl or halogen; Z is vinyl, halogen or lower alkyl; and p is from 0 to 5. These resins include homopolymers of styrene, chlorostyrene and vinyltoluene, random copolymers of styrene with one or more monomers illustrated by acrylonitrile, butadiene, alpha-methylstyrene, ethylvinylbenzene, divinylbenzene and maleic anhydride, and rubber modified polystyrenes comprising blends and grafts wherein the rubber is a polybutadiene or a rubber copolymer of about 98–70% styrene and about 2–30% diene monomer. These rubber-modified polystyrenes include high impact polystyrene, or HIPS.

The proportion of polystyrene in component A is not critical, since polyphenylene ethers and polystyrenes are miscible in all proportions. Component A will generally contain about 5–50% (by weight) polystyrene, if any.

Component B is at least one linear polyester. The linear polyesters include thermoplastic poly(alkylene dicarboxylates) and alicyclic analogs thereof. They typically comprise structural units of the formula

wherein $R^4$ is a saturated divalent aliphatic or alicyclic hydrocarbon radical containing about 2–10 and usually about 2–6 carbon atoms and $A^1$ is a divalent aromatic radical containing about 6–20 carbon atoms. They are ordinarily prepared by the reaction of at least one diol such as ethylene glycol, 1,4-butanediol or 1,4-cyclohexanedimethanol with at least one aromatic dicarboxylic acid such as isophthalic or terephthalic acid, or lower alkyl ester thereof. The polyalkylene terephthalates, particularly polyethylene and polybutylene terephthalate and especially the latter, are preferred. Such polyesters are known in the art as illustrated by the following patents:

| | |
|---|---|
| 2,465,319 | 3,047,539 |
| 2,720,502 | 3,671,487 |
| 2,727,881 | 3,953,394 |
| 2,822,348 | 4,128,526 |

Because of the tendency of polyesters to undergo hydrolytic degradation at the high extrusion and molding temperatures encountered by the compositions of this invention, it is preferred that the polyester used as component B be substantially free of water.

The polyesters generally have number average molecular weights in the range of about 20,000 to 70,000, as determined by intrinsic viscosity (IV) at 30° C. in a mixture of 60% (by weight) phenol and 40% 1,1,2,2-tetrachloroethane. When resistance to heat distortion is an important factor, the polyester molecular weight should be relatively high, typically above about 40,000.

Because of the presence of both poly(alkylene dicarboxylates) and polymers containing carbonate units in the compositions of this invention, there is a possibility for ester-carbonate exchange resulting in degradation of one or both polymers, particularly at high molding temperatures. It is, therefore, sometimes preferred to incorporate in the compositions an agent which suppresses such exchange, typically in the amount of about 0.01 to 7.5% by weight of total polyester. It is generally preferred to precompound said exchange suppressing agent with the polyester. Precompounding may be achieved by direct blending or by forming a concentrate, typically with about 1 to 25% by weight of the polyester, and adding said concentrate to the remaining portion thereof.

Illustrative exchange suppressing agents are hydroxyaromatic compounds such as the hyroxybenzophenones disclosed in U.S. Pat. No. 4,452,932; salicylate compounds such as methyl salicylate, disclosed in U.S. Pat. No. 4,452,933; and sodium and potassium dihydrogen phosphates disclosed in U.S. Pat. No. 4,532,290. The disclosures of all of the foregoing patents relating to polyesters are also incorporated by reference herein.

According to the present invention, the tendency of blends of components A and B to be incompatible is overcome by incorporating component C in the composition. The essential ingredient of component C is a polymer containing a substantial proportion of aromatic polycarbonate units.

Among the preferred polymers of this type are the aromatic polycarbonate homopolymers. The structural units in such homopolymers generally have the formula

wherein $A^2$ is an aromatic radical. Suitable $A^2$ values include m-phenylene, p-phenylene, 4,4'-biphenylene, 2,2-bis(4-phenylene)propane, 2,2-bis-(3,5-dimethyl-4-phenylene)-propane and similar radicals such as those which correspond to the dihydroxyaromatic compounds disclosed by name or formula (generic or specific) in U.S. Pat. No. 4,217,438. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $A^2$ radicals are hydrocarbon radicals.

The $A^2$ radicals preferably have the formula

wherein each of $A^3$ and $A^4$ is a single-ring divalent aromatic radical and Y is a bridging radical in which one or two atoms separate $A^3$ from $A^4$. The free valence bonds in formula VII are usually in the meta or para positions of $A^3$ and $A^4$ in relation to Y. Such $A^2$ values may be considered as being derived from bisphenols of the formula HO-$A^3$-Y-$A^4$OH Frequent reference to bisphenols will be made hereinafter, but it should be understood that $A^2$ values derived from suitable compounds other than bisphenols may be employed as appropriate.

In formula VII, the $A^3$ and $A^4$ values may be unsubstituted phenylene or substituted derivatives thereof, illustrative substituents (one or more) being alkyl, alkenyl (e.g., crosslinkable-graftable moieties such as vinyl and allyl), halo (especially chloro and/or bromo), nitro, alkoxy and the like. Unsubstituted phenylene radicals are preferred. Both $A^3$ and $A^4$ are preferably p-phenylene, although both my be o- or m-phenylene or one o- or m-phenylene and the other p-phenylene.

The bridging radical, Y, is one in which one or two atoms, preferably one, separate $A^3$ from $A^4$. It is most often a hydrocarbon radical and particularly a saturated radical such as methylene, cyclohexylmethylene, 2-[2.2.1]-bicycloheptylmethylene, ethylene, 2,2-propylene, 1,1-(2,2-dimethylpropylene), 1,1-cyclohexylene, 1,1-cyclopentadecylene, 1,1-cyclododecylene or 2,2-adamantylene, especially a gem-alkylene radical. Also included, however, are unsaturated radicals and radicals which are entirely or partially composed of atoms other than carbon and hydrogen. Examples of such radicals are 2,2-dichloroethylidene, carbonyl, thio and sulfone. For reasons of availability and particular suitability for the purposes of this invention, the preferred radical of formula VI is the 2,2-bis(4-phenylene)-propane radical, which is derived from bisphenol A and in which Y is isopropylidene and $A^3$ and $A^4$ are each p-phenylene.

Various methods of preparing polycarbonate homopolymers are known, and any of them may be used for preparing component C. They include interfacial and other methods in which phosgene is reacted with bisphenols, transesterification methods in which bisphenols are reacted with diaryl carbonates, and methods involving conversion of cyclic polycarbonate oligomers to linear polycarbonates. The latter method is disclosed in U.S. Pat. No. 4,605,731, European Patent Application 162,379 and copending, commonly owned application Ser. No. 704,122, filed Feb. 22, 1985, now U.S. Pat. No. 4,644,053.

Various copolycarbonates are also useful as component C. One example thereof is the polyester-polycarbonates of the type obtained by the reaction of at least one dihydroxyaromatic compound with a mixture of phosgene and at least one dicarboxylic acid chloride, especially isophthaloyl chloride, terephthaloyl chloride or both. Such polyester-polycarbonates contain structural units of formula VI combined with units of the formula

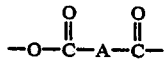
(VIII)

wherein $A^5$ is an aromatic and usually a p- or m-phenylene radical. Other examples are the siloxane-carbonate block copolymers disclosed, for example, in U.S. Pat. Nos. 3,189,662 and 3,419,634 and the polyphenylene ether-polycarbonate block copolymers of U.S. Pat. Nos. 4,374,223 and 4,436,876 which frequently provide compositions with substantially higher heat distortion temperatures than those containing homopolycarbonates. The disclosures of the patents and applications listed above relating to polycarbonates and copolycarbonates are also incorporated by reference herein.

The copolycarbonates should, for the most part, contain at least about 20% by weight of carbonate structural units. When the copolymeric units are other than ester units, the polymer preferably contains at least about 45% carbonate units.

The weight average molecular weight of the homo- or copolycarbonate should be at least about 40,000 (as determined by gel permeation chromatography relative to polystyrene). It is most often in the range of about 40,000 to 80,000 and especially about 50,000 to 80,000. However, compositions in which component C has a molecular weight in the range of about 80,000 to 200,000 often have favorable properties.

In most instances, component C consists of the polycarbonate or copolycarbonate; that is, said polymer is the entire component except for impurities. It is within the scope of the invention, however, to use as component C a blend of a polycarbonate or polyester-polycarbonate with a styrene homopolymer, typically having a number average molecular weight of about 50,000-250,000. Such blend generally contain at least 50% of the polycarbonate or polyester-polycarbonate.

It will be noted that various polystyrenes may be used in the invention as all or part of components A and C. However, the specific polystyrenes used may be different. The polystyrene in component A is a homopolymer, random copolymer or rubber-modified polystyrene, and homopolymers are used in component C. Moreover, polystyrenes are ordinarily present in only one of components A and C, if in either.

It is also within the scope of the invention to employ a polyester-aromatic polycarbonate blend as a source of part or all of components B and C. The use of such a blend may provide somewhat more flexibility in component proportions.

Particularly in compositions containing inactivated polyphenylene ethers and relatively small amounts of polycarbonate, it is frequently found that resistance to heat distortion is improved if there is also blended into the composition at least one compound selected from those containing at least one cyanurate or isocyanurate moiety and those containing a plurality of epoxide moieties. Illustrative cyanurates and isocyanurates are cyanuric chloride, triethyl cyanurate, triallyl cyanurate, triallyl isocyanurate and triphenyl cyanurate. Epoxide compounds include homopolymers of such compounds as glycidyl acrylate and glycidyl methacrylate, as well as copolymers thereof, preferred comonomers being lower alkyl acrylates, methyl methacrylate, acrylonitrile and styrene. Also useful are epoxy-substituted cyanurates and isocyanurates such as triglycidyl isocyanurate.

Compositions of the invention may be modified with at least one elastomeric impact modifier which is compatible with component A, the polyphenylene ether and optional alkenyl aromatic polymer. Suitable impact modifiers include various elastomeric copolymers, of which examples are ethylene-propylene-diene polymers (EPDM's), both unfunctionalized and functionalized with (for example) sulfonate or phosphonate groups; carboxylated ethylene-propylene rubbers; copolymers (usually block or graft) of alkenylaromatic compounds such as styrene and/or epoxy compounds such as glycidyl methacrylate with polymerizable olefins or dienes, including butadiene, isoprene, chloroprene, ethylene, propylene and butylene; and core-shell elastomers containing, for example, a poly(alkyl acrylate) core attached to a polystyrene shell via an interpenetrating network. Such core-shell elastomers are more fully disclosed in copending, commonly owned application Ser. No. 811,800, filed Dec. 20, 1985, now U.S. Pat. No. 4,675,468.

The preferred impact modifiers are block (typically diblock, triblock or radial teleblock) copolymers of alkenylaromatic compounds and olefins or dienes. Most often, at least one block is derived from styrene and at least one other block from at least one of butadiene, isoprene, ethylene and butylene. Especially preferred are the triblock copolymers with polystyrene end blocks and olefin- or diene-derived midblocks. When one of the blocks is derived from one or more dienes, it is frequently advantageous to reduce the aliphatic unsaturation therein by selective hydrogenation. The weight average molecular weights of the impact modifiers are typically in the range of about 50,000 to 300,000. Block copolymers of this type of commercially available from Shell Chemical Company under the trademark KRATON, and include KRATON D1101, G1650, G1651, G1652, G1657, and G1702.

Component D of the present compositions comprises a property improving amount of mica reinforcement. Mica is a discontinuous reinforcing aluminosilicate mineral filler in flake form, belonging to the phyllosilicate family. Large mica crystals can be split or delaminated into thin, flexible flakes. The most common micas in commercial useage are muscovites and phylogopites. Commercially available grades are available from a variety of sources, these are sold in dry and wet grades having particle sizes ranging from less than 500 microns (+325 mesh) to more than 500 microns (−40 mesh). Aspect ratios also vary widely.

It is within the scope of the invention for the composition to contain other conventional ingredients such as fillers, reinforcing materials, flame retardants, pigments, dyes, stabilizers, anti-static agents, mold release agents and the like. Also included are processability modifiers for component A, such as olefin copolymers. In general, the amounts of any other resinous components, if present, will not exceed about 15 by weight of total resin.

The preparation of the compositions of this invention is normally achieved by merely blending the ingredients thereof under conditions adapted for the formation of an intimate blend. Such conditions often include extrusion, which may be conveniently effected in a screw-type or similar extruder which applies a substantial shearing force to the composition, thereby decreasing the particle size thereof. The extrusion temperature is generally in the range of about 100°–325° C.

In one embodiment of the invention, a single extruder is employed which has at least two ports for introduction of ingredients, one such port being downstream from the other. Component A or any reactants for preparation thereof is introduced through the first port and extruded, preferably at a temperature in the range of about 300°–350° C. This portion of the extruder is preferably vacuum vented.

The remaining ingredients are introduced through the downstream port and extrusion is continued, preferably at a lower temperature to minimize degradation of component B. Typical extrusion temperatures at this stage are in the range of about 260° to 320° C.

In the following examples illustrating the invention, the blend constituents used were as follows:

Polyphenylene ether-a poly(2,6-dimethyl-1,4-phenylene ether) having a number average molecular weight of about 20,000 and an intrinsic viscosity in chloroform at 25° C. of 0.40 dl./g; it contained about 1000 ppm nitrogen.

PBT-a poly(butylene terephthalate) having a number average molecular weight, as determined by gel permeation chromatography, of about 50,000.

Polycarbonate-bisphenol A homopolycarbonate prepared interfacially and having weight average molecular weight of about 192,000.

SEBS Elastomer-an A-B-A triblock copolymer of styrene-ethylene butylene-styrene known as KRATON G 1651 from Shell Chemical Co.

Mica-commercially available from Suzorite Mica Products, Franklin Mineral, Harwick and U.S. Gypsum as specified in Table 1, grades of varying mesh used at 10 and 20 percent loadings.

Examples 1 to 10

Table 1 describes the compositions for several thermoplastic molding compositions provided in accordance with the present invention. The polyphenylene ether resin, the rubber modifier and the mica filler material were combined at the feed throat of a 30 mm Werner & Pfleiderer twin-screw extruder having a melt temperature ranging from approximately 550° to 650° F. A vacuum of approximately 20 in. Hg was applied to the melt. The remaining components, i.e., the polybutylene terephthalate resin an the polycarbonate resin were added downstream from the vacuum where the melt temperature ranged from approximately 520 to 570° F. It should be noted that optional embodiments of the present invention can also have the rubber and mica added at this downstream addition port rather than at the initial feedthroat. This may be especially useful under circumstances where less temperature and shear conditions are desirable.

The extrudate was quenched and pelletized. The thermoplastic products were molded on a Toshiba injection molding machine (8 ounce barrel capacity) into test specimens. Physical properties are reported in Table 2. The abbreviations are defined as follows:

HDT: heat distortion temperature measured at 66 psi reported in °F.

NI: notched Izod reported in ft-lb/in of notch

DYN: Dynatup R falling dart impact reported in ft-lb B indicates brittle failure D indicates ductile failure S indicates a split FM: flexural modulus reported in psi FS: flexural strength reported in psi TY: tensile yield reported in psi TS: tensile strength at break reported in psi T-elg: tensile elongation reported in %

CTE: coefficient of thermal expansion reported as times $10^{-5}$ in/in-°F. (i.e. 4.8 in table represents $4.8 \times 10^{-5}$ in/in-°F.)

SURFACE: surface appearance, relative scale with 5 being excellent and 1 being poor. The rating criteria are as follows: 5 is the unfilled control with an excellent surface appearance 3 is acceptable for painted surface with some slight imperfections, 1 is unacceptable with a rough surface such that painted parts would have an acceptable appearance. The ratings are qualitative and subtle differences (especially with regard to flow marks in the gate region) have been used to distinguish different filler types.

TABLE 1

| Sample | Mica Type | % Loading[a] |
|---|---|---|
| A* | Control - none | 0 |
| 1 | Suzorite 325 S | 10 |
| 2 | Suzorite 325 S | 20 |
| 3 | Suzorite 325 HK | 10 |
| 4 | Suzorite 325 HK | 20 |
| 5 | Franklin Mineral Bondica 101 | 10 |
| 6 | Franklin Mineral Bondica 101 | 20 |
| 7 | Harwick 325 HAR | 10 |
| 8 | Harwick 325 HAR | 20 |
| 9 | U.S. Gypsum 325 PT | 10 |
| 10 | U.S. Gypsum 325 PT | 20 |

*Comparative Example
[a]% loading by weight of mica per 100 parts by weight of the base composition
Base Composition:

| pbw | Component |
|---|---|
| 30 | polyphenylene ether |
| 46 | polybutylene terephthalate |
| 8 | polycarbonate |

TABLE 1-continued

| 16 | SEBS triblock copolymer elastomer |

TABLE 2

| Properties | A* | 1 | 2 | 3 | 4 | 5 | 6 | 7 | 8 | 9 | 10 |
|---|---|---|---|---|---|---|---|---|---|---|---|
| HDT | 314 | 326 | 344 | 328 | 350 | 337 | 349 | 331 | 335 | 340 | 342 |
| NI | 16.4 | 2.4 | 1.2 | 2.4 | 1.3 | 1.5 | 1.5 | 2.4 | 1.6 | 2.2 | 1.5 |
| DYN | | | | | | | | | | | |
| RT | 36 D | 34 S | 6 B | 32 S | 7 B | 10 B | 8 B | 37 D | 7 B | 34 S | 8 S |
| −20 | 36 D | 8 B | 2 B | 6 B | 3 B | 1 B | 2 B | 10 B | 5 B | 9 B | 1 B |
| FM | 265K | 352K | 458K | 358K | 447K | 381K | 422K | 352K | 447K | 376K | 476K |
| FS | 10K | 11K | 12K | 11K | 12K | 12K | 12K | 11K | 12K | 12K | 13K |
| TY | 6.8K | 6.5K | 6.7K | 6.4K | 6.6K | 7.2K | 7.4K | 7.0K | 7.2K | 7.2K | 7.5K |
| TS | 5.5K | 5.4K | 6.3K | 5.5K | 6.2K | 6.7K | 6.9k | 5.7K | 6.5K | 6.3K | 6.8K |
| T-elg | 38 | 48 | 22 | 50 | 26 | 29 | 25 | 44 | 33 | 30 | 24 |
| CTE | 5.80 | | | | | 4.82 | 4.10 | 4.63 | 3.98 | 4.76 | 3.98 |
| SURFACE | 5 | | | | | 3 | 2 | 3 | 2 | 3 | 2 |

A* COMPARISON

COMPARATIVE EXAMPLES

Conventional fillers can be incorporated into the base resin matrix of the present invention with varying results.

For example, the coefficient of thermal expansion (CTE) can be improved by the use of chopped glass fiber or glass sphere reinforcement. However, the surface appearance of such compositions is exceptionally poor, and generally unacceptable for most high quality automotive applications.

Excellent surface appearance can be obtained with clay fillers but CTE improvement is inadequate. Calcium carbonate fillers provide mixed to good surface appearance but, again, CTE improvement is inadequate.

The compositions of the invention provided in Examples 1 to 10 show a good balance of surface appearance, improved CTE, and good retention of other important physical properties. The following comparative data is offered as illustrative of less satisfactory choices.

For each of Tables 3 to 5, the base resin was the same as in Table 1: 30 parts by weight polyphenylene ether, 46 parts by weight polybutylene terephthalate, 8 parts by weight polycarbonate, and 16 parts by weight SEBS triblock copolymer elastomer. In each of Tables 3 to 5, 10 or 20 percent by weight of the indicated comparative filler was utilized, the control contained no filler. Extruding and molding was accomplished as above.

TABLE 3

| | Clay Filler | | |
|---|---|---|---|
| | Control | 10%* | 20%** |
| HDT | 314 | 319 | 338 |
| NI | 16.2 | 4.1 | 1.6 |
| DYN | | | |
| RT | 36 D | 31 S | 26 S |
| −20 | 36 B | 17 B | 13 B |
| FM | 265K | 303K | 341K |
| FS | 10K | 11K | 11K |
| TY | 6.8K | 6.7K | 6.8K |
| TS | 5.5K | 5.8K | 6.1K |
| T-elg | 38 | 50 | 36 |
| CTE | 5.80 | 5.72 | 4.80 |
| SURFACE | 5 | 5 | 5 |

*Harwick calcined clay #5
**Natka 1200 Clay

TABLE 4

| | Calcium Carbonate Fillers | | |
|---|---|---|---|
| | Control | 10%* | 20%* |
| HDT | 314 | — | — |
| NI | 16.2 | 3.0 | 1.0 |
| DYN | | | |
| RT | 36 D | 48 D | 4 B |
| −20 | 36 B | 5 B | 2 B |
| FM | 265K | 300K | 338K |
| FS | 10K | 11K | 11K |
| TY | 6.8K | 7.0K | 6.2K |
| TS | 5.5K | 6.1K | 6.0K |
| T-elg | 38 | 27 | 10 |
| CTE | 5.80 | 5.44 | 5.14 |
| SURFACE | 5 | 3 | 2 |

*Genstar Camel Wite ST calcium Carbonate

TABLE 5

| | Glass Sphere Reinforcement | | |
|---|---|---|---|
| | Control | 10%* | 20%* |
| HDT | 314 | 331 | 329 |
| NI | 16.2 | 2.1 | 1.0 |
| DYN | | | |
| RT | 36 D | 5 B | 2 B |
| FM | 265K | 291K | 309K |
| FS | 10K | 11K | 10K |
| TY | 6.8K | 6.6K | 6.2K |
| TS | 5.5K | 5.6K | 6.1K |
| T-elg | 38 | 29 | 9 |
| SURFACE | 5 | 1 | 1 |

*Potters 3000 CP-01 Glass Spheres

Table 6 reports comparative data for compositions utilizing chopped glass fibers. Formulations were prepared as in the previous Examples and Comparative Examples except that only 2 parts by weight of SEBS rubber was utilized in these glass filled compositions instead of the 16 aparts used in the other examples.

TABLE 6

| | Chopped Glass Fibers | | | |
|---|---|---|---|---|
| | Control | 10.7%* | 9.5%** | 21.4%** |
| HDT | 238 | 308 | 319 | 332 |
| NI | 0.3 | 0.6 | 1.0 | 1.2 |
| U-NI$^{(a)}$ | — | 9.3 | 13.0 | 13.1 |
| DYN | | | | |
| RT | 1 B | 4 B | 1 B | 1 B |
| FM | 357K | 568K | 636K | 787K |
| FS | 12K | 17K | 19K | 22K |
| TY | 8.6K | 11.4K | 12.7K | 14.3K |
| TS | 8.6K | 11.4K | 12.7K | 14.3K |
| T-elg | 10 | 8 | 9 | 8 |
| CTE | 5.80 | 3.29 | 3.55 | 2.81 |

TABLE 6-continued

| | Chopped Glass Fibers | | |
|---|---|---|---|
| | Control | 10.7%* | 9.5%** | 21.4%** |
| SURFACE | 5 | 2 | 2 | 1 |

*Manville R16-1 chopped glass fiber
**Manville R26-1 chopped glass fiber
(a)Un-notched Izod Impact In view of the foregoing it will be readily apparent that conventional filler systems do not offer the flexibility in providing a balance of key properties afforded by compositions of the present invention. The foregoing Examples should not be construed as limiting the scope of the invention in any way. It is within the scope of the invention for the compositions to contain other conventional ingredients such as fillers, flame retardants, colorants, stabilizers, anti-static agents, mold release agents and the like. The presence of other resinous components is also contemplated. These include impact modifiers compatible with the polyester component such as various graft and core-shell copolymers of such monomers as butadiene, styrene, butyl acrylate and methyl methacrylate. It is frequently preferred to pre-extrude such impact modifiers with the polyester component prior to its utilization in the invention. All of the above-mentioned patents and applications are hereby incorporated by reference.

What is claimed is:

1. A thermoplastic composition comprising:
   I. 100 parts by weight of a compatible blend of the following resinous cmponents and any reaction products thereof, all percentage proportions being by weight of total resinous components;
      (A) about 10 to 80% of at least one polyphenylene ether, or a blend thereof with at least one pollystyrene;
      (B) about 10 to 90% of at least one poly(alkylene dicarboxylate), the weight ratio of component A to component B being at most 4:1; and
      (C) from 3% to about 50% of at least one polymer containing a substantial proportion of aromatic polycarbonate units and having a weight average molecular weight of at least about 40,000 as determined by gel permeation chromatography relative to polystyrene, or a blend thereof with a styrene homopolymer; and
   (II) about 1 to about 50 parts by weight mica per 100 parts of 1.

2. A composition as in claim 1 wherein said mica has a particle size of about 45 to 500 micron.

3. A composition as in claim 1 wherein said mica has a particle size of about 200 to 400 micron.

4. A composition as in claim 1 wherein said mica is present in an amount of approximately 5 to 30 parts by weight per 100 parts by resinous 5. A composition as in claim 1 wherein said polyphenylene ether is a poly-(2,6-dimethyl-1,4-phenylene ether).

6. A composition according to claim 1 wherein component B is a poly(ethylene terephthalate) or a poly(butylene terephthalate) and the polycarbonate units in component C are bisphenol A polycarbonate units.

7. A composition according to claim 6 wherein component B is a poly(butylene terephthalate) having a number average molecular weight in the range of about 20,000-70,000.

8. A composition according to claim 1 wherein the proportion of component A is about 20-40% that of component B is about 50-75% and that of component C is about 5-20%.

9. A composition according to claim 8 wherein component C is a polycarbonate homopolymer having a weight average molecular weight in the range of about 40,000-200,000.

10. A composition according to claim 8 wherein component C is a polyester-polycarbonate.

11. A composition according to claim 1, further comprising 2 to 30 parts by weight of a rubbery impact modifier per 100 parts of the composition comprised of components I. and II. taken together.

12. A composition according to claim 11 wherein said impact modifier is a triblock copolymer wherein the end blocks are derived from styrene and the midblock is derived from at least one of isoprene, butadiene, ethylene, and butylene.

13. An article of manufacture comprised of the thermoplastic composition of claim 1.

* * * * *

UNITED STATES PATENT AND TRADEMARK OFFICE
CERTIFICATE OF CORRECTION

PATENT NO. : 4,816,510

DATED : March 28, 1989

INVENTOR(S) : John B. Yates, III

It is certified that error appears in the above-identified patent and that said Letters Patent is hereby corrected as shown below:

In claim 1, column 15, line 31, change "cmponents" to -- components --.

In claim 1, column 15, lines 35-36, change "pollystyrene" to -- polystyrene --.

In claim 4, column 16, line 11, add -- components I -- after "resinous".

In claim 1, column 15, line 33, change the semicolon to a colon.

Signed and Sealed this

Twenty-seventh Day of October, 1992

Attest:

DOUGLAS B. COMER

*Attesting Officer*    *Acting Commissioner of Patents and Trademarks*